(12) United States Patent
Shaplyko

(10) Patent No.: US 10,589,624 B2
(45) Date of Patent: Mar. 17, 2020

(54) POWER TAKE-OFF DEVICE FOR AN INTERNAL COMBUSTION ENGINE

(71) Applicant: Pavel Valerievich Shaplyko, Minsk (BY)

(72) Inventor: Pavel Valerievich Shaplyko, Minsk (BY)

( * ) Notice: Subject to any disclaimer, the term of this patent is extended or adjusted under 35 U.S.C. 154(b) by 22 days.

(21) Appl. No.: 16/073,739

(22) PCT Filed: Sep. 15, 2016

(86) PCT No.: PCT/BY2016/000005
§ 371 (c)(1),
(2) Date: Jul. 27, 2018

(87) PCT Pub. No.: WO2017/127910
PCT Pub. Date: Aug. 3, 2017

(65) Prior Publication Data
US 2019/0009674 A1    Jan. 10, 2019

(30) Foreign Application Priority Data
Jan. 28, 2016   (EA) ................................ 201600173

(51) Int. Cl.
*B60K 25/00*   (2006.01)
*F02B 67/04*   (2006.01)

(52) U.S. Cl.
CPC ............. *B60K 25/00* (2013.01); *F02B 67/04* (2013.01)

(58) Field of Classification Search
CPC ................................ B60K 25/00; F02B 67/04
(Continued)

(56) References Cited

U.S. PATENT DOCUMENTS 9,032,920 B2 *  5/2015  Robards ................... F01B 1/10
123/56.2

FOREIGN PATENT DOCUMENTS

EP    2924262 A1    9/2015
RU    2220303 C2    12/2003
(Continued)

OTHER PUBLICATIONS

Rotor Engines website. Engine and fuel efficiency. Jul. 20, 2015. http://www.rotor-motor.ru/page08.htm.
(Continued)

*Primary Examiner* — Keith J Frisby
(74) *Attorney, Agent, or Firm* — Jansson Munger McKinley & Kirby Ltd.

(57) ABSTRACT

The invention relates to power take-off devices for internal combustion engines and can be used, in particular, in different vehicles for taking power from reciprocating internal combustion engines. The present power take-off device for an internal combustion engine comprises at least two pairs of transfer mechanisms, coupled to the pistons of an engine, wherein a transfer mechanism is adapted to convert the reciprocating motion of its corresponding piston into rotary motion of a corresponding power take-off shaft. Each transfer mechanism comprises a means of setting rotation, which is mounted on a shaft connected to the piston, said means comprising a transfer component with at least one continuous, wave-like, vertically guiding track in the form of a guiding contact path, and a running wheel which moves along the contact path and has a fixed vertical position. The device provides an increase in engine efficiency of up to 50% and reduces the number of revolutions for similar levels of power output.

5 Claims, 6 Drawing Sheets

(58) Field of Classification Search
USPC .................................................. 74/11, 15.2
See application file for complete search history.

(56) References Cited

FOREIGN PATENT DOCUMENTS

| | | |
|---|---|---|
| RU | 2464432 C2 | 7/2010 |
| RU | 2500907 C2 | 12/2013 |

OTHER PUBLICATIONS

Full Throttle! website. Rotary piston engine. Principle of operation. Jan. 18, 2016. http://avto-mpl.com/index.php/article/item/28-rotorniy-dvigatel-princip-raboty.

Model Maker and Developer website. Engines in plain sight. Mar. 31, 2014. http://modelist-konstruktor.com/razrabotki/dvigateli-na-ladoni.

* cited by examiner

POWER TAKE-OFF DEVICE FOR AN INTERNAL COMBUSTION ENGINE

This invention relates to engine construction technologies, in particular, power take-off devices for internal combustion engines (ICE), and may specifically be used in various vehicles to take off power from piston internal combustion engines providing a synchronous independent drive for both the vehicle itself and for various engineering drives without the use of any additional transfer mechanisms (belts, chains, etc.).

The engine is a primary source of mechanical power in a vehicle and is utilized as a power drive. Vehicles are equipped with engines of different designs, of which piston internal combustion engines are the most widely spread ones. Rotary internal combustion engines (Wankel engines) are used much less often, and an increasingly larger number of manufacturers tend to prefer the use of combined cycle (hybrid) power units that include a combination of a piston ICE and an electric motor. However, for all known kinds of engines it is yet to be resolved how to significantly improve their efficiency while simplifying the design of both the ICEs themselves, and their power takeoff devices.

State-of-the-art internal combustion engines reached their current efficiency factors and fuel efficiencies many decade ago, with the introduction of direct injection systems and the turbocharging of the air entering the cylinders. Therefore, at the moment significant ICE improvement spendings (finance, time, etc.) mostly result in much more complex ICE designs while the efficiency improves by as little as 2-3%. With all the complexity, the efficiency factor of the best gasoline-fired engines (with forced spark-plug ignition) is within 25-30%, while the efficiency of diesel-fired motors in the most energy-saving large-size designs (with numerous additional complex devices) stays around 40-45% [1]. Currently, ICEs may also be improved due to high technology achievements in various industries related to engine construction (electronic controls, mechanotronics, tribo-engineering, chemmotology, material science, processing technology, etc.) and are not associated with fundamental changes in conventional power flow diagrams.

It is well known to the persons skilled in the art that the ICE's efficiency consists of a number of factors, including the mechanical efficiency that demonstrates the portion of the engine's active performance wasted to overcome various kinds of mechanical resistance and to drive additional parts and assemblies both within the engine itself, and within the power takeoff device to which it is connected mechanically. The low mechanical efficiency of current ICEs is, among other things, conditioned by distinct power loss to overcome friction forces and reciprocal motion inertia, as well as by the loss on drive auxiliary mechanisms.

However, the author of this invention is of the opinion that, apart from the said losses that are reasonably hard or impossible to eliminate, the largest portion of the power loss during the transfer of energy generated by the expanding fuel mixture to the power takeoff shaft is "contributed" by structural features/defects of the power takeoff device that is mechanically connected to ICE whose conventional design is that of a crank-and-rod mechanism. Such defects prevent the force generated by the moving piston from being fully transmitted to the power takeoff shaft (due to a "small angle" of vertical deviation of the connecting rod, upon ignition of the fuel mix the main force is applied "against" the crankshaft thus significantly reducing the useful work). By fundamental changes in the configuration of the power takeoff device, inefficient losses on overcoming the crankshaft's backforce may be eliminated, which will help to significantly increase the power takeoff even if the said power losses, defined by the persons skilled in the art as mechanical losses, remain largely the same or experience very little reduction.

At the same time, it is well known to the persons skilled in the art that mechanical losses also depend on the engine's power flow diagram. In addition, the power flow diagram and its design solution also affect another ICE's crucial operational indicator—torque value and conditions. Within a standard piston engine, the response of the crankgear's connecting rod (the cross component of this response in relation to the cylinder axis) to the pressure applied by the working gas constantly presses the piston to one of the cylinder sides followed by pressing it to another one. This engine operation system requires that the friction surfaces always be lubed, and results in a power loss to overcome the friction. In addition, while the crankgear's crank is rotating, the projection of the shoulder creating a torque to the piston movement vector constantly changes in cycles from "nil" to "maximum" and back with each power stroke. Only at high speeds of piston engines does the torque force experience a significant increase due to a large number of cycles. However, most consumers never run it at high speeds (around 3-4 (up to 5.5) thousand RPM). According to the inventor, the speed may be allowed to drop down to the required lower values, if a shorter "path" is used between the cycles (1.5-2 times reduction may be achieved for the design according to this invention), while a shorter "path" with the same high rotation speed may increase the power by the same number of times.

In the general embodiment the crankgear design (other than the aforementioned adverse impact on the ICE's efficiency) is complex itself and demonstrates insufficient reliability taking into account the large number of movements of structural elements along complex trajectories (crank's connecting rod moves in a complex plane-parallel direction), and a large number of forces applied to the crankgear's structural elements in various directions. In addition, the crankgear design requires that the fuel be supplied under pressure to thrust bearings and structurally does not allow the use of much more reliable roller bearings that operate with lower power loss to overcome the friction as compared to slider bearings.

In 1958, the Wankel rotary piston engine was invented [2], whose configuration helps to eliminate some of the aforesaid drawbacks. Such engine's operating chamber is of elongated oval shape, while the piston rotor design is triangular with convex sides. By rotating on the eccentric within the operating chamber, the rotor transfers the torque to the engine's shaft. At least two rotors are required to balance it (especially at idle RPM). The key difference and positive feature of the Wankel rotary engine is that it requires no reciprocally moving parts. All the moving mechanisms and, more importantly, the piston rotor itself move along a circle without any hard stops. The Wankel rotary engine has a simple and compact design. According to the analysts, the Wankel rotary engine's efficiency factor (thermal and mechanical efficiency) is around 40-45% (as compared to the 25% efficiency of regular piston ICEs and up to 40% efficiency demonstrated by state-of-the-art turbo diesel engines). At the same time, rotary piston engines experience a range of drawbacks that prevent their wide use in mechanical engineering. Worth mentioning are the following drawbacks: engineering complexity for manufacturing, short engine life, frequent lube changes, ignition spark plugs heat up to high temperatures and go out of order, poor geometry of the combustion chamber (resulting in poor firing of the air-fuel mix), prone to overheating, high requirements to chamber sealing, hard to lube all the rotor's and engine case's friction surfaces, high fuel consumption, and insufficient power performance.

At the same time, the Wankel engine's improvements known from the art are aimed at elimination of only several basic design's drawbacks, for example, power performance improvement [3], and fail to provide an all-in-one solution to the problems.

Various designers attempt to not only upgrade the existing engine designs by performance improvement, but to also develop engines of brand new designs. Thus, well known Russian designer A. S. Abramov, apart from a number of other unconventional engine designs, came up with a cam-piston engine [4]. This engine's difference from the classic design is that, while it does have cylinders (three cylinders), it does not make use of a crankgear. It is the rollers and cam bushings that are used in this engine to transform the pistons' reciprocal movements into the rotation of the outlet shaft. Rollers are secured to T-shaped rods bars of piston rods. Ends of the bars enter vertical grooves in the crankcase walls that serve as guides for the rods and prevent the pistons from turning within the cylinders. By "rolling down" along the profiled cams, rollers force them to rotate about themselves (if the cam's cylindrical surface is turned in plane, its profile will look as a sinusoid). By rotating its bushing with a gearwheel each piston turns the outlet shaft as well. The design according to this invention, as illustrated by the model figures, appears to be simple and efficient and provides an engine efficiency increase due to reduction in losses on friction in cylinders and bearings. However, a more detailed analysis of the proposed design proves that it is absolutely inoperable. Thus, a change in the location points of cylinder rods by moving them along the horizontal trajectory, as marked out by the cams, as well as no alignment of the vertical movements between piston rods may cause the pistons to move within the ranges outside the specified cycles, as well as result in a vertical deviation from the cylinders' reciprocal movement trajectory. Movements of the bars of T-shaped piston rods in vertical grooves available in the crankshaft walls will inevitably cause the bars to quickly warp within the grooves and jam therein. However, more importantly, this design is based on an initially disadvantageous principle of power transfer from the expanding gases known as "against the crankcase—actuator", while no operable, high-efficiency design may be obtained unless it relies on the "against the combusted fuel mix—actuator" principle.

Thus, the state-of-the-art analysis suggests that no ICE designs are known today that would eliminate the said drawbacks while significantly increasing the efficiency factor. No prototypes of the proposed ICE power takeoff device were found in the state of the art.

The purpose of this invention is to develop an ICE power takeoff device of simple, practically feasible, and highly-reliable design providing a significant (up to 40-50%) efficiency increase (the initial efficiency value may be predetermined due to various designs of structural elements). At the same time, the structure must operate at up to 1.5 slower speeds for comparable power values, be more maintainable and have longer life cycle for both the power takeoff device, and ICE in general.

Since, as it was already mentioned, almost no further efficiency improvements are possible in conventionally designed ICEs without a much more complex design, which generally results in additional drawbacks affecting the adaptability to streamlined manufacture, reliability, maintainability, etc., the author of the proposed engineering solution based it on a brand new power flow diagram that rules out the use of a crankgear and the related drawbacks. Within this diagram the complex movement of the crankgear's structural elements, in particular those connected to the connecting rod ICE pistons, was replaced by two simple movements—vertical reciprocal (undertaken by each piston and the power transmission element of the relevant transmission mechanism the piston is connected to), and rotary movement (of the transmission mechanism's traveling wheel connected to the relevant power take-off shaft). In fact, both movements were "separated" between individual structural elements. Further on, the movements forced by each of the ICE pistons were actually "separated", while separate transmission mechanisms of the simplest configuration transmit the torque within the design to separate outlet power take-off shafts. However, the connections are preserved between the connecting transmission mechanisms to support the forced synchronization of their operation.

Thus, the goal is achieved by the proposed power take-off device of the internal combustion engine that includes at least two pairs of transfer mechanisms coupled to the engine's pistons. The number of transfer mechanisms corresponds to the number of pistons. Each transfer mechanism is adapted to convert reciprocating motion of the corresponding engine piston into a rotary motion of a corresponding power take-off shaft, and comprises a rotation setting mechanism mounted on an axle connected to the piston to allow for vertical reciprocal motion coordinated with the motion of the piston. The rotation setting mechanism comprises a transfer component with an annular lower end surface forming at least one continuous guiding track in the form of a wavelike guiding contact path with two symmetrically positioned protrusions and two depressions. Also, the rotation setting mechanism comprises at least one runner in fixed vertical position and configured for traveling along the corresponding guiding contact path and following a horizontal circular trajectory during the reciprocal vertical motion of the transfer components, thus transferring the rotation to the corresponding power take-off shaft. Each runner comprises a pair of bearings symmetrically installed on a horizontal axle which is rigidly secured to the power take-off shaft. The number of runners corresponds to the number of guiding contact paths. All adjacent transfer mechanisms are linked in pairs using a horizontal movement coordinator comprising a series of gear wheels, each of which is rigidly secured to the corresponding power take-off shaft, all the gear wheels being in the same plane and successively linked with one another through a gear clutch forming a closed structure. All adjacent transfer mechanisms are also linked in pairs using a vertical movement coordinator that enables an antiphase reciprocal vertical motion of the transfer components in each pair of the transfer mechanisms.

The proposed power take-off system design as described above optimally takes into account all of the aforementioned principles for distribution of movements between structural elements and the transfer of torques to individual power take-off shafts.

In the preferred embodiments of the proposed power take-off system the vertical coordinator is an articulation linkage with a central rocker and two symmetrical same-length connecting rods pivotably attached with respect to the corresponding rotation setting mechanism. This embodiment is the simplest and most efficient in terms of the coordination of movements. At the same time, it does not rule out the use of other types of motion coordinators.

In other preferred embodiments of the proposed power take-off device, the lower end surface of each transfer component includes a pair of wavelike vertical guiding contact paths enabling simultaneous coordinated motion of a pair of the runners in opposite directions, each runner being connected to a separate corresponding power take-off shaft, with the rigidly mounted gear wheel in gear clutch engagement with the gear wheels of the adjacent power take-off shafts.

In various preferred embodiments of the proposed power take-off system, the shape of the wavelike vertical guiding contact paths, including at least the depression-to-top distance, rounding radii of the depression and top, and tangent inclination, may be selected with the pre-set operating parameter(s) of the engine, selected out of the group, which at least includes the working piston stroke, output power, and engine efficiency. Thus, the ICE performance parameters may essentially be adjusted by just changing the shape of the vertical wave-like guiding contact paths.

The above and other qualities and advantages of the proposed ICE power take-off device may be further discussed in the examples of some possible preferred, but not restrictive, embodiments with references to positions on the drawing figures that schematically illustrate the following:

Figure 1:
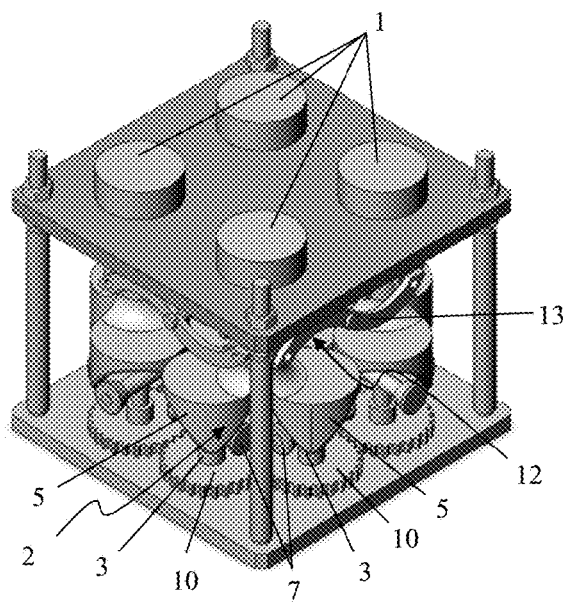
FIG. 1 is a general view of the proposed ICE power take-off system in one of the possible embodiments.
Figure 2:
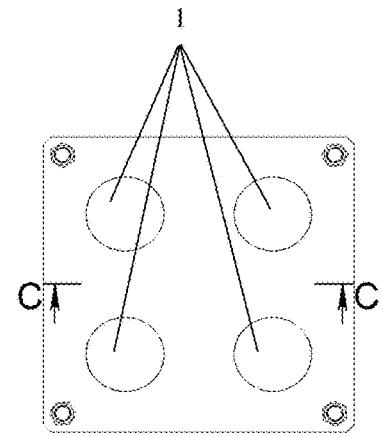
FIG. 2 is a top view of the device according to FIG. 1.
Figure 3:
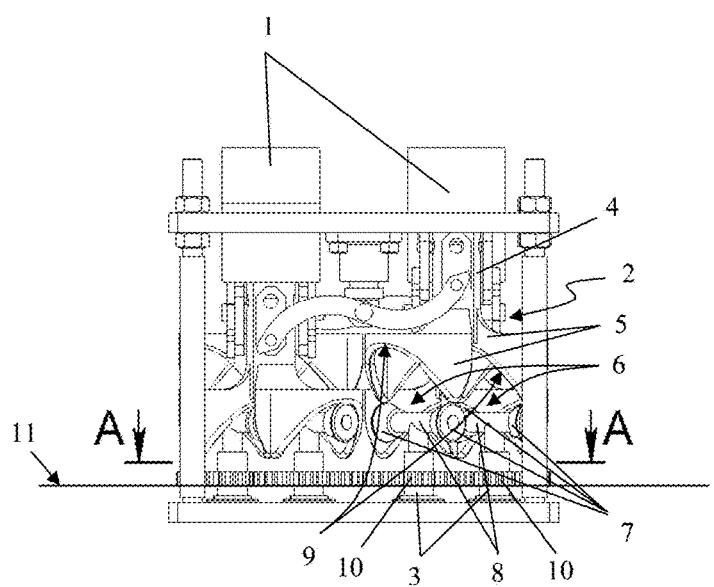
FIG. 3 is a front view of the device according to FIG. 1.

FIG. 1 provides a schematic representation of the general view, FIG. 2 is a top view, and FIG. 3 is a front view of the proposed ICE power take-off device in one of the possible embodiments. The device is shown without a crankcase for visualization purposes and to demonstrate there are no "linkages" of the device's structural elements to the crankcase. In addition, for the purposes of "simplifying" the drawings, they will demonstrate positions that correspond to structural elements linked to one piston only, while for the remaining pistons the available references will still remain true.

The power take-off device in the exemplified embodiment includes two pairs of transfer mechanisms 2 coupled to engine pistons 1 (i.e. four transfer mechanisms for four ICE pistons). Each transfer mechanism 2 is adapted to convert reciprocating motion of the corresponding piston 1 into a rotary motion of a corresponding power take-off shaft 3. Each transfer mechanism 2 is designed to incorporate piston-linked axle 4 that includes rotation setting mechanism 5, and two runners 6 that must at all times remain vertical for the subject embodiment. Each runner 6 (see FIG. 6) comprises a pair of bearings 7 symmetrically installed on horizontal axle 8 which is rigidly secured to power take-off shaft 3. The lower end surface of each transfer component 5 (see FIGS. 7 and 8) includes a pair of continuous wavelike vertical guiding tracks in the form of wavelike guiding contact paths 9 that are ring-shaped in plane and have two symmetrically positioned protrusions 16 and two depressions 17. Runners 6 are designed in a way that enables their simultaneous coordinated movement in opposite directions along corresponding guiding contact paths 9 following the circular trajectory in horizontal projection during the reciprocal vertical motion of transfer component 5, thus transferring the rotation to corresponding power take-off shaft 3. In general, the number of runners 6 corresponds to the number of guiding contact paths 9. All adjacent transfer mechanisms 2 are linked in pairs using a horizontal movement coordinator comprising a series of gear wheels 10, each of which is rigidly secured to the respective power take-off shaft 3. All gear wheels 10 lie in the same plane 11, and are successively linked with one another through toothed wheel gearing, forming a closed design. All adjacent transfer mechanisms 2 are also linked in pairs using a vertical movement coordinator that enables antiphase reciprocal vertical motion of transfer components 5 in each pair of the transfer mechanisms. In the subject embodiment, the vertical movement coordinator is an articulation linkage 12 with a central rocker 13 and two symmetrical same-length connecting rods 14 that are pivotally attached to the corresponding transfer mechanism. Central rocker 13 is secured to support 15 and is capable of oscillating movement in the vertical plane.

Figure 4:
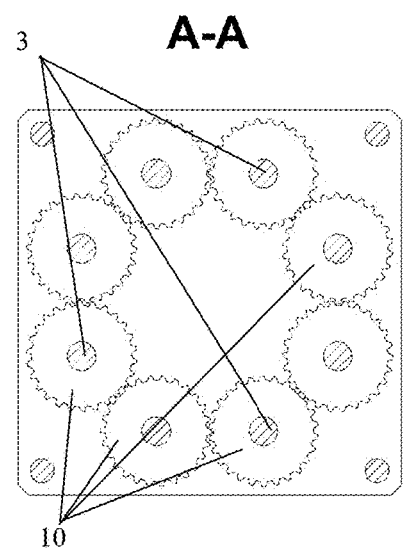
FIG. 4 is a section A-A according to FIG. 3.

FIG. 4 is a schematic representation of section A-A according to FIG. 3, which in greater detail shows the vertical transfer mechanism coordinator being a series of gear wheels 10, each of which is rigidly mounted on the corresponding power take-off shaft 3 and positioned in the same plane 11, and successively linked with one another through a toothed wheel gear clutch, forming a closed structure.

Figure 5:
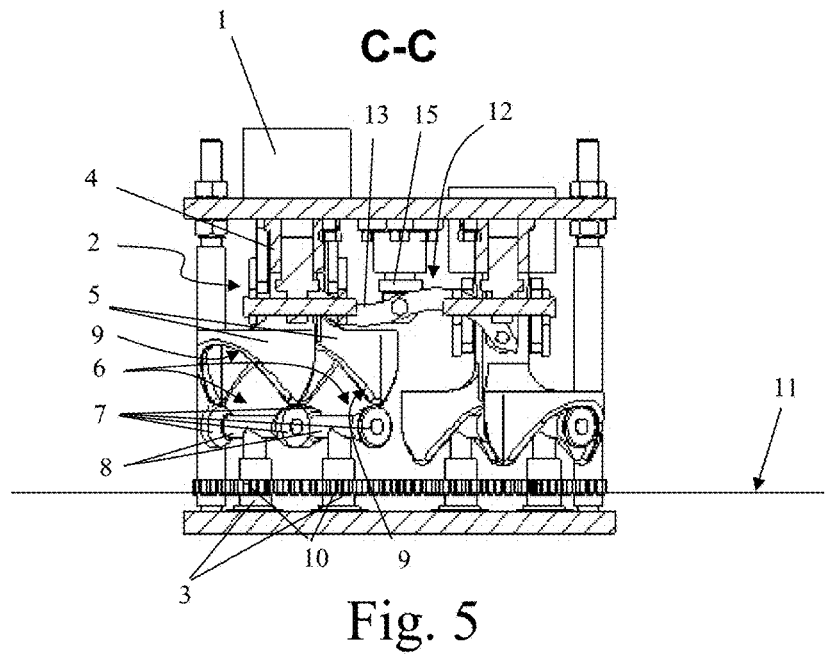
FIG. 5 is a section C-C according to FIG. 2.

FIG. 5 is a schematic representation of section C-C according to FIG. 2, which in greater detail shows interactions between all structural elements.

Figure 6:
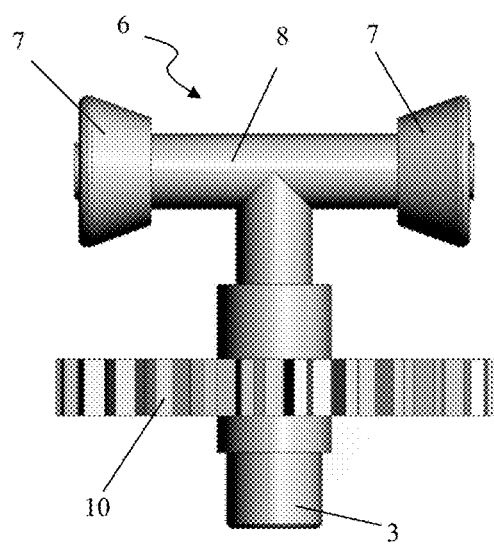
FIG. 6 is a front view of the runner with a gear wheel in one of the possible embodiments.

FIG. 6 shows in greater detail the front view of runner 6 in one of the possible embodiments. Runner 6 has a pair of bearings 7 symmetrically installed on horizontal axle 8 which is rigidly mounted on power take-off shaft 3.

Figure 7:
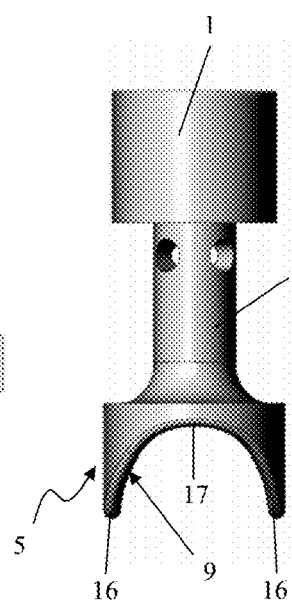
FIG. 7 is a side view of the transfer component in one of the possible embodiments.
Figure 8:
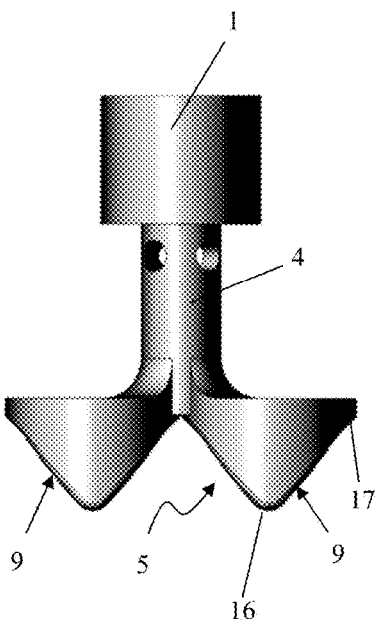
FIG. 8 is a front view of the transfer component according to FIG. 7.

FIG. 7 is a schematic representation of the side view, and FIG. 8 is the frontal view, of transfer component 5 in one of the possible embodiments. The lower end surface of each transfer component 5 is a pair of continuous wavelike vertical guiding tracks in the form of wavelike guiding contact paths 9 that are ring-shaped in plane and have two symmetrically positioned protrusions 16 and two depressions 17.

Figure 9:
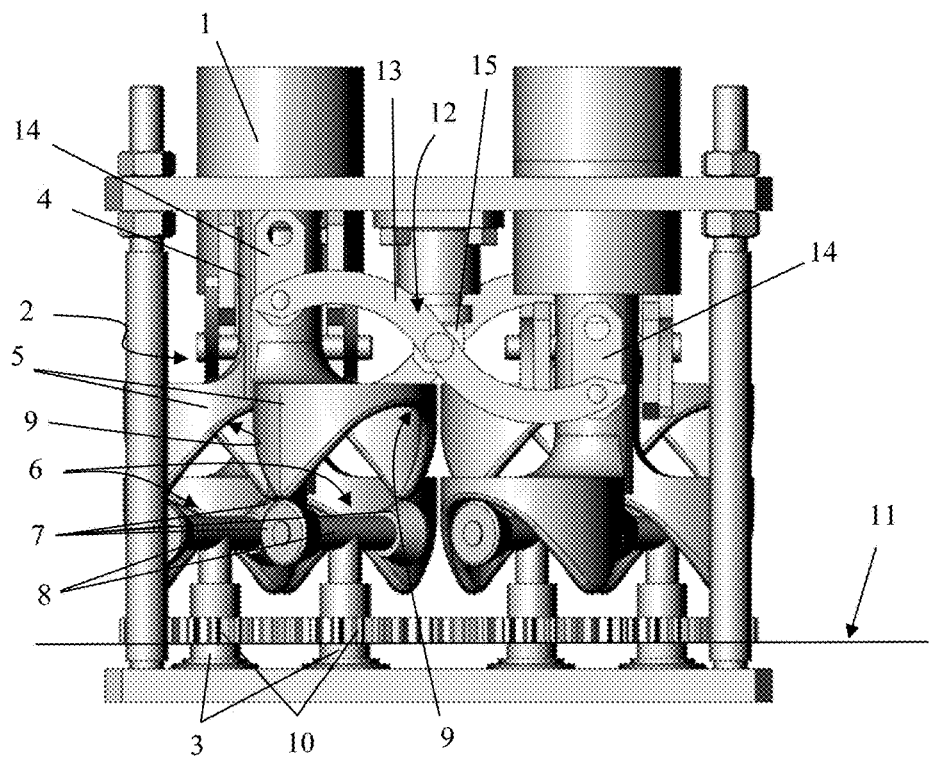
FIG. 9 is a front view of the device according to FIG. 1 (transfer mechanism in bottom dead-center point)
Figure 10:
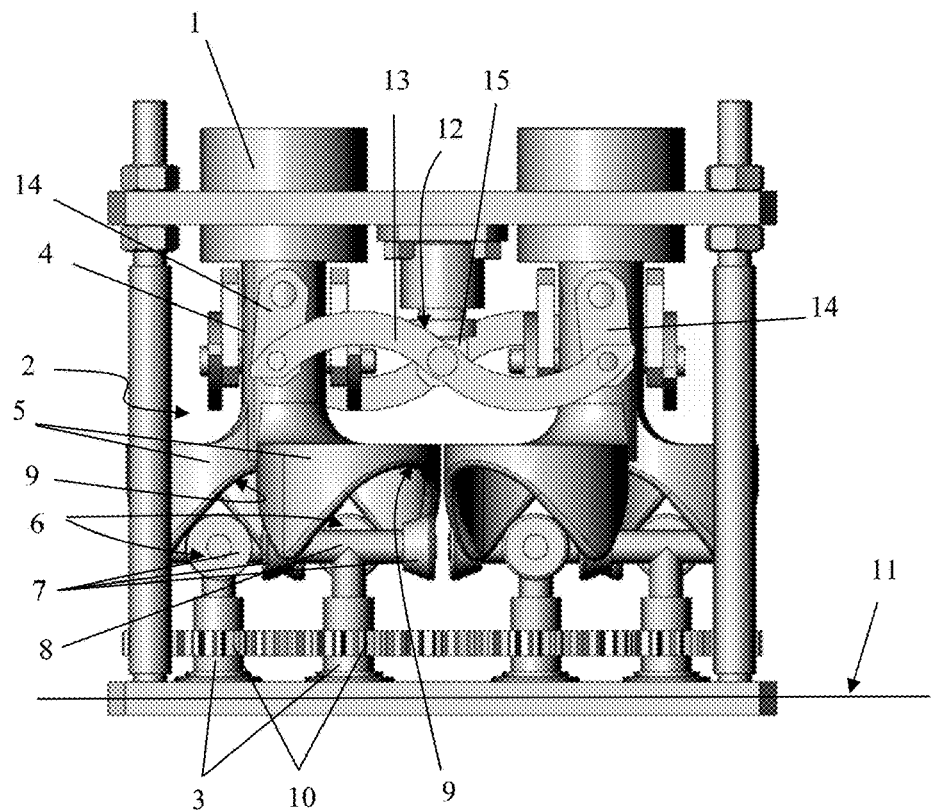
FIG. 10 is a front view of the device according to FIG. 1 (transfer mechanism in midpoint)
Figure 11:
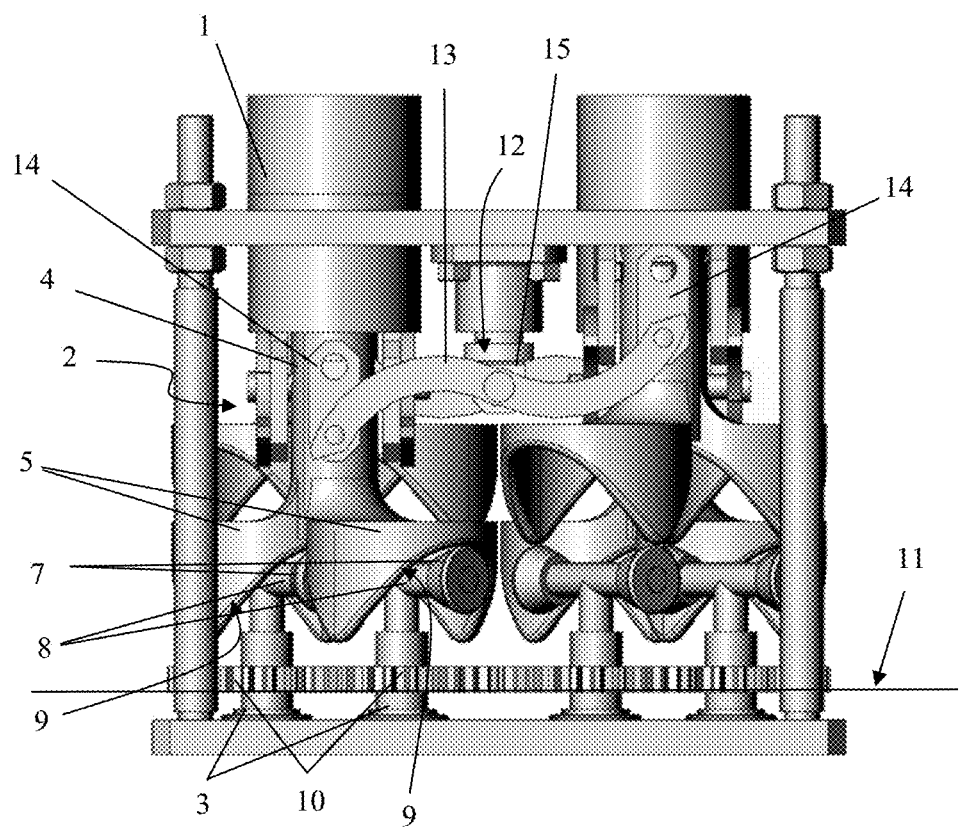
FIG. 11 is a front view of the device according to FIG. 1 (transfer mechanism in top dead-center point)

FIGS. 9-11 are schematic representations of the front view of the subject device with the transfer mechanism of the subject embodiment in different positions i.e. bottom dead center (BDC) position, mid-point position, top dead center (TDC) position.

The shape of wavelike vertical guiding contact paths 9 is defined by distance H between depression 17 and protrusion 16, rounding radii r of the depression 17 and R of protrusion 16, and an angle of inclination α of the tangent, etc. Such shape meets the preset operating parameters of the engine (working stroke of the pistons 1, output power, efficiency, etc.).

Figure 12:
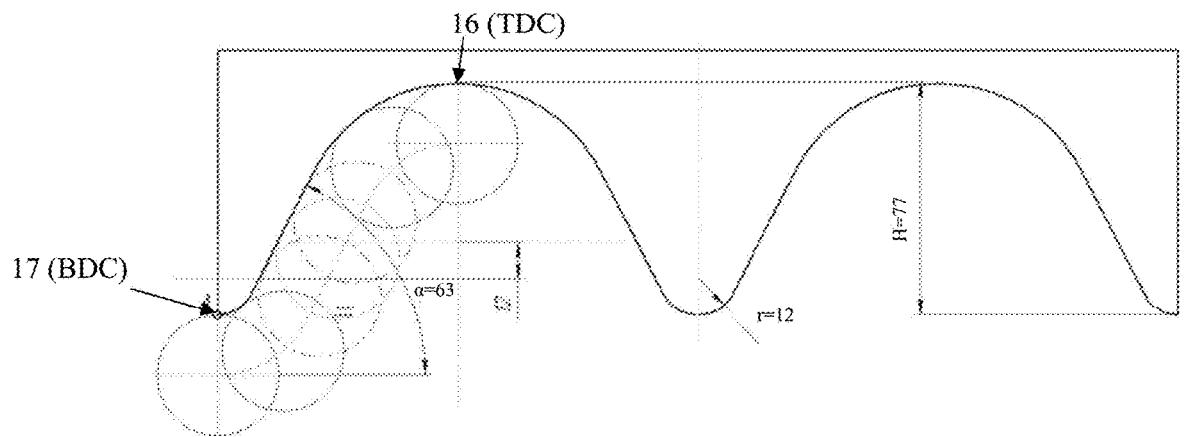
FIGS. 12 and 13 show curved traveling paths of the runners for various embodiments of the wavelike vertical guiding contact paths.
Figure 13:
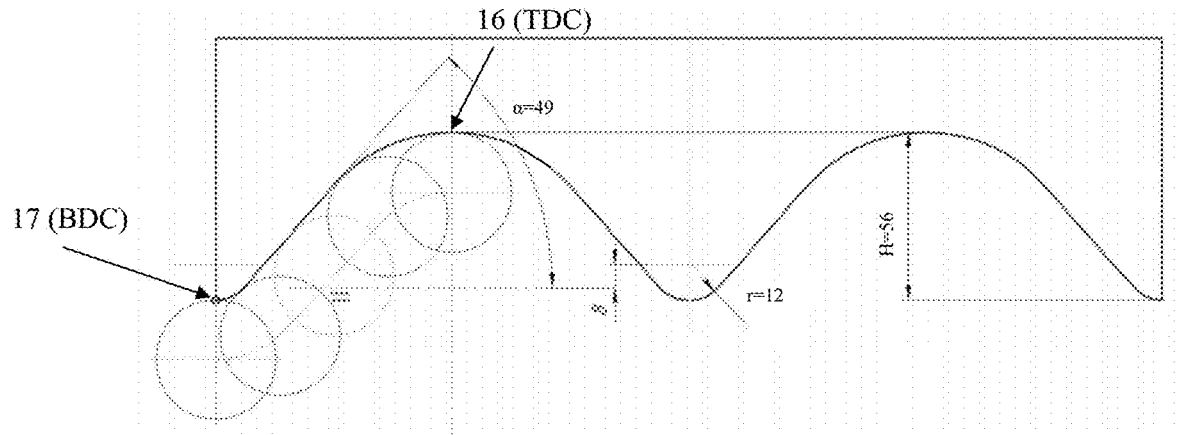

FIGS. 12-13 schematically show the curved traveling paths 9 of runners 6 for various embodiments of wavelike vertical guiding contact paths 9. The circumferences show the successive movement of bearing 7 of runner 6 along guiding contact path 9.

Figure 14:
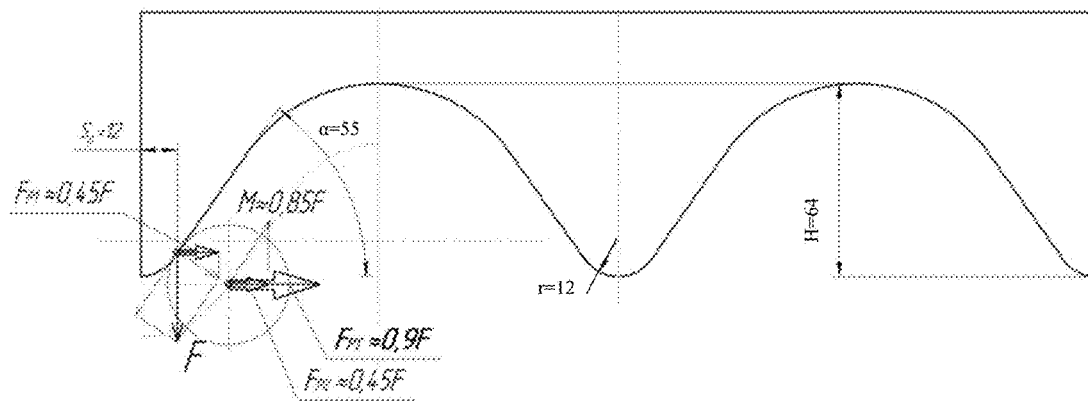
FIGS. 14 and 15 depict the pattern of calculating the useful work $F_P$ at various stages of the piston's working stroke.
Figure 15:
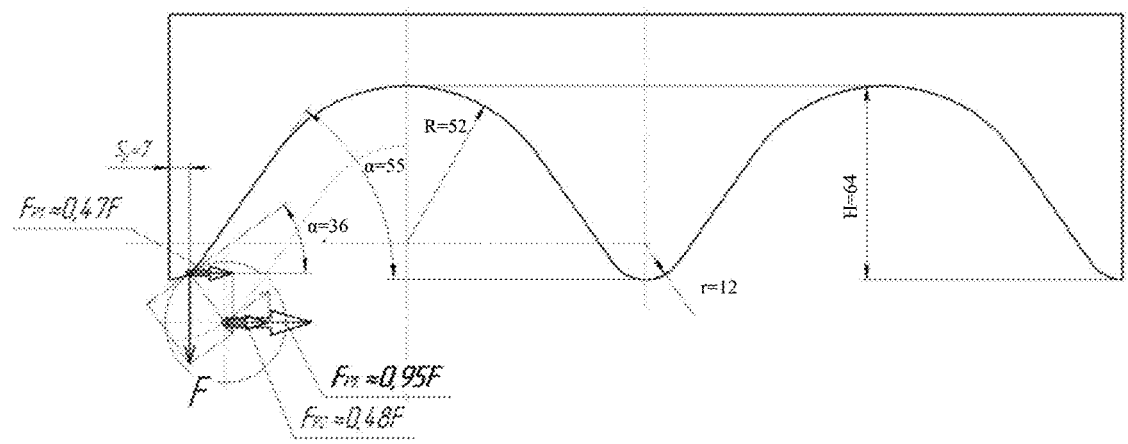

FIGS. 14-15 show the pattern of calculating the useful work $F_{P\Sigma}$ at various stages of the working stroke of the piston 1 ($S_\rho$=12 mm and $S_\rho$=7 mm) for the proposed power take-off device.

Figures 16, 17, 18:
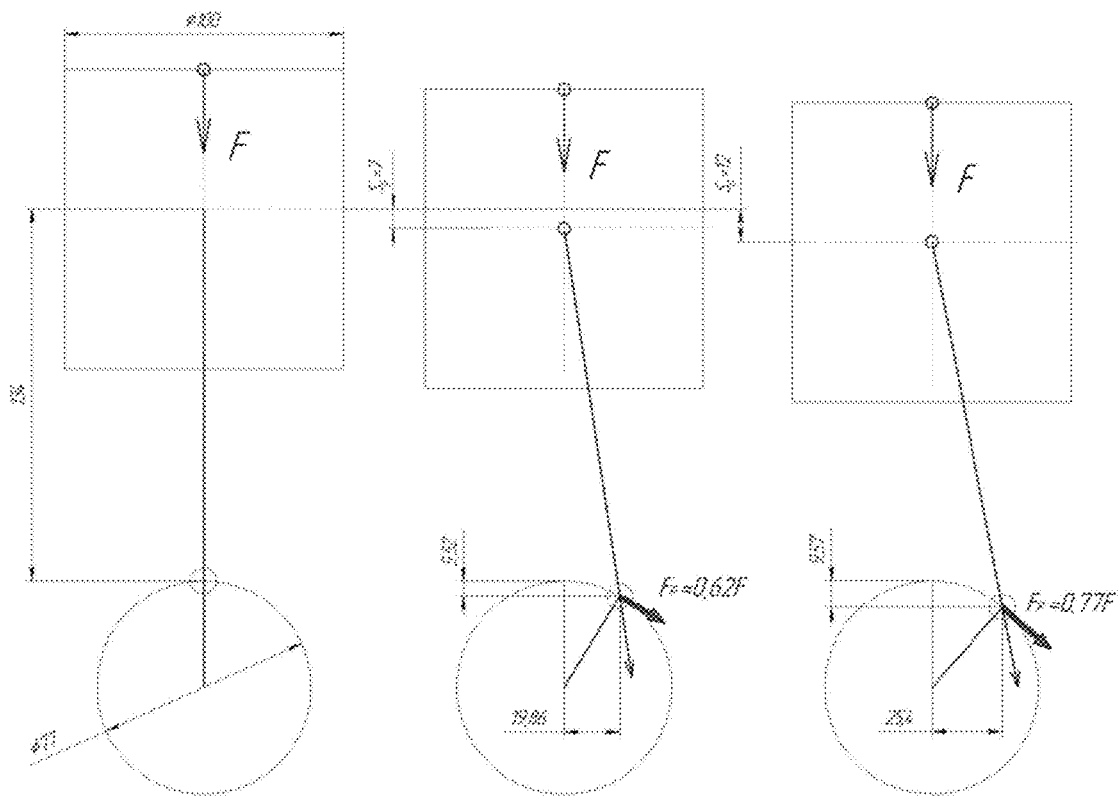
FIGS. 16 through 18 depict the pattern of calculation of the useful work $F_P$ of the crankgear for stages similar to the stages of the working stroke of the piston shown in FIGS. 14 and 15.

FIGS. 16-18 show the pattern of calculation of the useful work $F_P$ of the crankgear for stages similar to those in FIGS. 14-15 showing stages ($S_\rho$=12 mm and $S_\rho$=7 mm) of the working stroke of the piston.

The proposed ICE power take-off device operates as follows.

A four-cylinder two-bank engine is fitted out with the proposed power take-off device. As the actual displacement (about 2 mm in height) of the fuel mixture ignites in one of the ICE cylinders, it expands (roughly 6-fold), and propels the corresponding piston 1 downward (from TDC to BDC). Piston 1 of each cylinder is attached to the corresponding transfer mechanism 2. Adjacent transfer mechanisms 2 are linked in pairs in a way that makes the pistons travel in opposition. The sequence of movements completed through transfer mechanism 2 for each cylinder (piston 1) is the following (similar processes occur concurrently in the third of the four cylinders):

the expanding fuel mixture pushes axle 4 with transfer component 5 attached to it vertically down. In this exemplary embodiment, the annular lower end surface of such component has two continuous wavelike vertical guiding tracks in the form of guiding contact paths 9 with two symmetrically positioned protrusions 16 and two depressions 17;

during its vertical downward movement, transfer mechanism 2 comes in contact with either of the two guiding contact paths 9 with the corresponding runner 6 causing it to travel on a continuous wavelike vertical guiding track from TDC through the mid-point position to BDC. However, because runner 6 stays vertical all the time, its bearings 7, installed on horizontal axle 8 which is rigidly secured to power take-off shaft 3, merely travel in circles within the same horizontal plane. It should be noted that runners 6 travel in the same phase, but in opposite directions;

since horizontal axle 8 of each runner 6 is rigidly attached to corresponding power take-off shaft 3, whilst runners 6 travel in circles, each power take-off shaft 3 is set in motion causing rigidly mounted gear wheels 10 to rotate in opposite directions;

each gear wheel 10 of the wheel pair of a single transfer mechanism 2 rotates and through a gear clutch causes rotation of gear wheel 10 of paired (adjacent) transfer mechanism 2 which in turn rotates the corresponding first power take-off shaft 3;

rotating power take-off shaft 3 sets in motion horizontal axle 8 that is rigidly attached to it, and also through a gear clutch rotates second power take-off shaft 3 of the given transfer mechanism 2 which in turn rotates horizontal axle 8 to which it is rigidly attached in the opposite direction;

rotating (in opposite directions) horizontal axles 8 cause bearings 7 of vertically-fixed runners 6 to merely travel in identical circles within the same horizontal plane and, upon coming in contact with corresponding guiding contact paths 9 of the respective transfer components 5 (transfer components 5 are in antiphase to those of paired transfer mechanism 2) and by traveling on continuous wavelike guiding paths 9, push transfer component 5 upwards thereby moving the transfer mechanism 2 vertically upwards from BCP through the midpoint position to TCP.

The process is identical, as described above, for each pair of adjacent cylinders and, consequently, adjacent transfer mechanisms 2.

Each component of the proposed power take-off device does only one type of movement, i.e., vertical reciprocal, circular or rotating, thus avoiding "parasite" shear forces arising for example when the connecting rod moves inside the crankgear. Any potential "shears" that may arise during operation are avoided by the presence of the movement coordinator of the transfer mechanisms 2, both horizontally and vertically. Moreover, not only do the aforementioned movement coordinators enable the pre-set movement of each structural element (by trajectory, range, etc.), but they also synchronize simultaneous induced movement of all structural elements, both in pairs, and within the entire proposed device, thus ensuring uninterrupted operation and eliminating any unscheduled emergencies (e.g. jamming, etc.)

For example, all adjacent transfer mechanisms 2 are linked in pairs by a series of gear wheels 10 coordinating horizontal movement, each of gear wheels 10 being rigidly secured to corresponding power take-off shaft 3. All gear wheels 10 lie in the same plane 11 and are successively linked with one another through a gear clutch (the toothed wheel gearing) forming a closed structure. This enables simultaneous and synchronized rotation of all power take-off shafts 3 and vertical "stability" of the design of the proposed power take-off device in combination with the ICE.

All adjacent transfer mechanisms 2 are linked in pairs and their vertical movements are coordinated using articulation linkages 12, each of which includes a central rocker 13 and two symmetrical same-length connecting rods 14 on the rocker's ends that are pivotably attached to respective transfer components 5 and respective ends of central rocker 13. Central rocker 13 is secured to support 15 and is capable of oscillating movement in the vertical plane.

With adjacent transfer mechanisms 2 moving in antiphase, connecting rods 14 that are pivotably attached to the respective transfer components rotate and change the vertical position of the ends of central rocker 13 (due to being pivotably linked to such ends). While the ICE is in operation, central rocker 13 performs an oscillating movement in the vertical plane, with the top and bottom positions of central rocker 13 being equivalent to TCP and BCP of transfer mechanisms 2 (when positioned horizontally, central rocker 13 corresponds to the mid-point position of transfer mechanisms 2).

For transfer mechanisms 2, the TCP and BCP positions are strictly determined by the geometry of the guiding contact path 9 (being identical for all transfer mechanisms 2).

The form of wavelike vertical guiding contact paths 9 (distance H between depression 17 and protrusion 16, rounding radii r of depression 17 and R of protrusion 16, angle of inclination α of the tangent, etc.) may also be used to set operating parameters of the ICE (working stroke of the pistons 1 (by adjusting TPC and BCP), output power, efficiency (by adjusting the α angle) etc.).

Power can be taken off the take-off shafts 3 in any suitable mode—simultaneously for different users (for each user off each individual shaft) or by "combining" the power off multiple power take-off shafts 3 for its transfer to a single user.

The aforementioned potential significant improvement of efficiency (to 40-50%) is schematically illustrated in FIGS. 14 and 15 (pattern of calculating the useful work $F_{P\Sigma}$ for various stages of the working stroke of the piston 1) vs. the useful work $F_P$ of the crankgear at similar stages ($S_p$=12 mm and $S_p$=7 mm) of the working stroke (FIGS. 16-18). Useful work is done by piston 1 within the first 12 mm of its stroke from TCP down to BCP (the cylinder capacity is about 2 mm with the fuel mixture expanding roughly sixfold) while the maximum useful work is done on the first millimeters of the stroke of piston 1. Calculations reveal that, in the first 7 mm, the useful work $F_{P\Sigma}$ of the proposed power take-off device of the stroke of the piston 1 represents 95% of the F force applied to the piston 1 as a result of the fuel mixture expansion, and it is 90% of F at the 12 mm. Under comparable conditions, the useful work of the crankgear is 77% and 62% of F, respectively. Since useful work is key in calculating a coefficient of efficiency of an ICE, the higher the work, the higher (proportionally) the ICE efficiency. Therefore, increase of useful work by 1.4-1.5 times may achieve the corresponding increase in efficiency.

The aforementioned calculations were done for the embodiment of the geometric shape of the wavelike vertical guiding contact paths 9 shown in FIGS. 14 and 15 (distance H=64 mm, r=12 mm, R=52 mm, α=36° by 7 mm, and α=55° by 12 mm). Performed tests revealed that, by varying the aforesaid parameters determining the geometric shape of the wavelike vertical guiding contact paths within technically reasonable ranges, efficiency increase up to 2 times (compared for efficiency coefficient of ICEs with conventional take-off devices—crankgear) may be achieved.

Therefore, the power take-off device of the present invention has a simple technological and highly reliable design providing effective efficient mutual connections and synchronization of operation of all of its structural elements. The inventive device provides an increase in engine efficiency of up to 40-50% and may be used in piston ICEs of different vehicles providing power take-off by multiple users.

INFORMATION SOURCES

1. "Rotor Engines" website. Engine and fuel efficiency [Website]—Jul. 20, 2015. Available at: http://www.rotor-motor.ru/page08.htm.
2. "Full throttle!" website. Rotary piston engine. Principle of operation. [Website]—Jan. 18, 2016. —Available at: http://avto-mpl.com/index.php/article/item/28-rotorniy-dvigatel-princip-raboty.
3. Patent RU No. 2464432 ?2, published on Jul. 27, 2010.
4. Website "Model Maker and Developer" Engines in plain sight, published on Mar. 31, 2014. [Website]—Jan. 18, 2016. —Available at: http://modelist-konstruktor.com/razrabotki/dvigateli-na-ladoni.

The invention claimed is:

1. A power take-off device for an internal combustion engine, comprising:
at least two pairs of transfer mechanisms coupled to engine pistons, a number of such transfer mechanisms being equal to a number of the engine pistons, each transfer mechanism being adapted to convert reciprocating motion of the corresponding engine piston into a rotary motion of a corresponding power take-off shaft, each transfer mechanism comprising:
a rotation setting mechanism mounted on an axle which is connected to the piston to allow vertical reciprocal motion coordinated with the motion of the piston, the rotation setting mechanism comprising a transfer component which has an annular lower end surface defining at least one continuous wavelike guiding track formed by a guiding contact path having symmetrically positioned pairs of protrusions and depressions; and
at least one runner in a fixed vertical position and configured for traveling the corresponding guiding contact path along a horizontal circular trajectory during the reciprocal vertical motion of the transfer components thereby transfering the rotation to the corresponding power take-off shaft, each runner comprising a pair of bearings symmetrically installed on a horizontal axle which is rigidly secured to the power take-off shaft, a number of the runners corresponding to a number of the guiding contact paths;
a horizontal-movement coordinator connecting adjacent transfer mechanisms of the pairs and comprising a series of gear wheels each of which is rigidly secured to the corresponding power take-off shaft, the gear wheels being in the same plane and successively linked with one another through a gear clutch forming a closed structure; and
a vertical-movement coordinator enabling an antiphase reciprocal vertical motion of the transfer components in each pair of the transfer mechanisms.

2. The device of claim 1 wherein the vertical-movement coordinator is formed by an articulated linkage comprising a central rocker and two symmetrical same-length connecting rods pivotably secured with respect to the corresponding rotation setting mechanism.

3. The device of claim 2 wherein the lower end surface of each transfer mechanism includes a pair of wavelike guiding contact paths enabling simultaneous coordinated motion of a pair of the runners in opposite directions, each runner being connected to the corresponding power takeoff shaft to which the gear wheel is rigidly secured and is in gear clutch engagement with the gear wheels of the adjacent power takeoff shafts.

4. The device of claim 3 wherein a shape of the wavelike guiding contact paths has at least a distance between the depression and the protrusion, rounding radii of the depression and the protrusion, and a tangent inclination angle, such shape corresponding to operating engine parameters selected from a group including at least a piston stroke, an output power and an efficiency coefficient.

5. The device of claim 1 wherein the lower end surface of each transfer component includes a pair of wavelike guiding contact paths enabling simultaneous coordinated motion of a pair of the runners in opposite directions, each runner being connected to the corresponding power takeoff shaft with the gear wheel rigidly secured thereto and in gear clutch engagement with the gear wheels of the adjacent power take-off shafts.

* * * * *